United States Patent [19]

Cushenbery et al.

[11] Patent Number: 4,532,837
[45] Date of Patent: Aug. 6, 1985

[54] NIPPLE GROOVING DEVICE

[76] Inventors: Terry E. Cushenbery, 700 West Fourth, Kingman, Kans. 67068; Jeffrey A. Bryant, 315 West First, Udall, Kans. 67146

[21] Appl. No.: 417,670

[22] Filed: Sep. 13, 1982

[51] Int. Cl.³ .......................... B23B 3/22; B23B 5/04; B21B 3/06; B26D 3/06
[52] U.S. Cl. .................................. 82/4 C; 72/125; 83/875; 30/293
[58] Field of Search .................. 82/4 R, 4 C; 29/557; 72/125; 83/875; 30/233, 293

[56] References Cited

U.S. PATENT DOCUMENTS

| | | | |
|---|---|---|---|
| 2,634,643 | 4/1953 | Krooss | 32/4 |
| 2,752,174 | 6/1956 | Frost | 285/194 |
| 2,766,518 | 10/1956 | Costanzo | 29/517 |
| 3,015,502 | 1/1962 | Frost et al. | 285/112 |
| 3,020,068 | 2/1962 | Costanzo | 285/55 |
| 3,024,046 | 3/1962 | Frost et al. | 285/104 |
| 3,189,969 | 6/1965 | Sweet | 24/279 |
| 3,247,743 | 4/1966 | Frost et al. | 82/4 |
| 3,680,894 | 8/1972 | Young | 285/112 |
| 3,699,828 | 10/1972 | Piatek et al. | 82/4 C |
| 3,754,488 | 8/1973 | Pajari | 82/4 C |
| 3,756,629 | 9/1973 | Gibb | 285/112 |
| 3,761,114 | 9/1973 | Blakeley | 285/111 |
| 3,817,649 | 6/1974 | Meoney | 82/4 |
| 3,903,722 | 9/1975 | Thau, Jr. et al. | 72/105 |
| 3,995,466 | 12/1976 | Kunsman | 72/106 |
| 4,165,892 | 8/1979 | Piatek et al. | 285/111 |

OTHER PUBLICATIONS

Brochure, "Vitaulic Field Assembly and Installation Instructions Pocket Handbook", Copyright 1980 by Victaulic Company of America, pp. 1, 16, 17, 40, 41, 42 and 43.

Primary Examiner—Francis S. Husar
Assistant Examiner—William E. Terrell
Attorney, Agent, or Firm—D. A. N. Chase; Michael Yakimo, Jr.

[57] ABSTRACT

In the on-site manufacture of nipples of relatively short length for joining pipe sections in a conduit system, spacer pins and spacers are selected to achieve a user-determined displacement between an end stop and cutting element of a pipe groover used for cutting external annular grooves along the pipe stock. The use of the spacer pins and spacers allows the grooving tool to be displaced at measured displacements from a selected end of the pipe stock while providing a visual gauge to the user of such displacement.

In the fabrication of these nipples, the end stop/yoke is positioned abutting a selected end of the pipe stock thereby positioning the cutting element where a first groove is cut. Upon selection of a combination of spacer pins and/or spacers the end stop is again positioned to abut the selected end of the pipe stock thereby positioning the cutting element where a second groove is cut. Finally upon the selection of a subsequent combination of spacer pins and/or spacers the end stop is positioned to abut the selected end of the pipe stock thereby positioning the cutting element where a third groove is cut. This third groove defines the length of the nipple once separated from the pipe stock.

10 Claims, 6 Drawing Figures

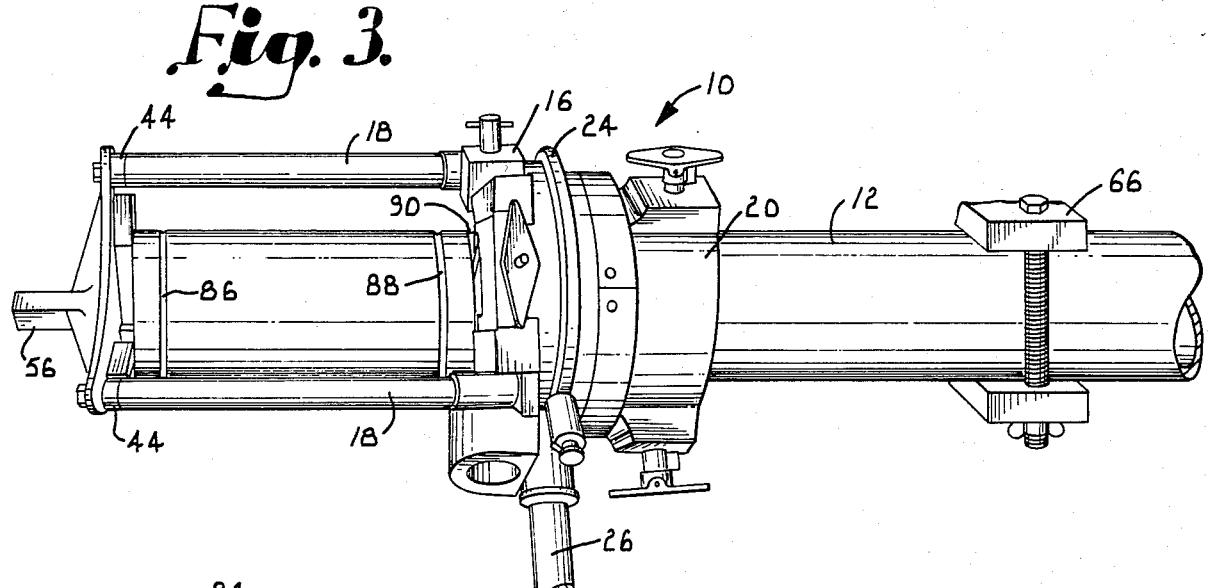
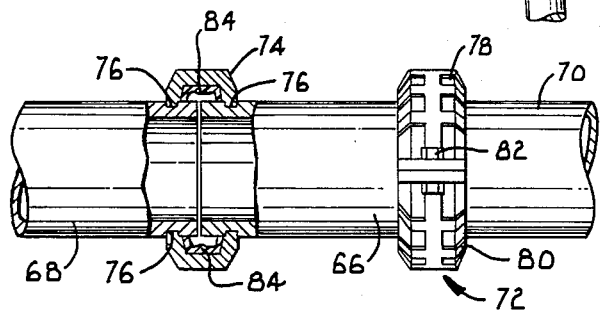
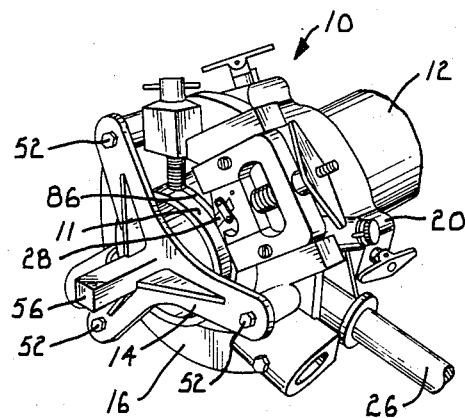
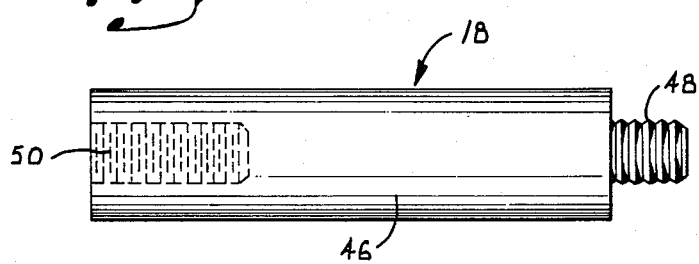

NIPPLE GROOVING DEVICE

BACKGROUND OF THE INVENTION

This invention relates to pipe connecting nipples and more particularly, to a novel method and accompanying apparatus operable with a pipe groover for on-site manufacture of pipe nipples having annular seats/grooves adjacent the opposed ends thereof.

In pipe conduit systems individual pipe sections are joined by means of annular, fluid-tight, couplings secured about the pipe ends. An annular, key housing element of the coupling seats in annular grooves adjacent the facing ends of the respective pipes so as to join the pipes one to the other. Within the seated key housing is an annular, pressure-responsive gasket which presents a fluid-tight joint connecting the pipe ends. Frequently, in the construction of pipe conduit systems, a need arises for a short connecting pipe, intermediate the respective pipes and operable with such couplings to provide a connector element therebetween. It therefore becomes desirable to fabricate at the job site such a connector or "nipple".

Various pipe grooving tools for cutting the annular seats or grooves in pipes are available. These "groovers" are employed on the job site for cutting an annular groove adjacent each pipe end so as to present the seat for the key housing element of the coupling. One example of such a grooving tool is the Vic-Groover manufactured by Victaulic Company of America.

The Vic-Groover positions the tool housing and cutting bit therein at a fixed position along the by means of a cover yoke or end stop connected to the tool housing. Once the end stop abuts the end of the pipe the cutting bit is at a fixed displacement along the pipe which presents a like displacement of the subsequently scored annular groove.

The current procedure in fabricating a connector/nipple on the job site is for the operator to secure a section of the pipe stock in a vice or clamp-like device at a position which allows the Vic-Groover to be secured on one end of the pipe. A yoke/end stop associated with the tool housing presents a fixed longitudinal displacement of the cutting bit from the yoke. Upon abutment of the yoke with the pipe end, the cutting bit is positioned at a like fixed displacement from the pipe end. The initial groove is then cut about the pipe fixed distance. Next the pipe is repositioned in the vice so that the Vic-Groover may be repositioned at the opposite end of the pipe. This repositioning allows a second annular groove to be scored at the same standard distance from the opposed end of the pipe. The distance is preset so as to present an appropriately spaced seat for securement of a portion of the standardized coupling therein. Thus annular grooves at the opposed ends of the nipple are presented which cooperates with the annular grooves in the upstream and downstream pipe to present seats for the respective upstream and downstream key housings therein.

A problem arises in the above procedure when the required length of the nipple is of such a short length that it is impossible to vice the pipe at a position which does not interfere with the positioning and operation of the Vic-Groover on the respective pipe ends. This problem usually arises when the required length of the nipple is relatively short e.g., 2 to 12 inches in length. Thus factory supplied connectors must be utilized. It therefore is desirable to find a means to fabricate a nipple of a relatively short length on the job site.

In response to this problem we provide a pipe grooving method and accompanying apparatus that precludes the above problem of on-site manufacture of short nipples. The system is shown as adapted for use in combination with the Vic-Groover and utilizes a plurality of interchangeable extension pins referred to as spacer pins of user selectable lengths that connects the yoke/end stop with the tool housing to present a corresponding longitudinal displacement therebetween. Initially, a piece of pipe stock is clamped at a length away from the selected end of the pipe stock with said length being greater than the desired nipple length. The conventional connecting bolts provide a first standard displacement of the tool housing and cutting member therein from the selected pipe end upon abutment of the yoke with the same. After scoring the first annular groove about the pipe a set of spacer pins engage the conventional bolts and tool housing so as to provide a greater longitudinal displacement of the tool housing from the yoke member. Upon abutment of the yoke with the same selected pipe end a corresponding displacement of the tool housing and cutting member is presented along the pipe for scoring of the second annular groove therearound. Finally, a new set of spacer pins replaces the first set to present the cutting member beyond the second annular groove upon yoke abutment with the selected pipe end. Scoring of this third annular groove defines the opposed end of the nipple prior to separation of the same from the pipe stock.

Alternatively, the Vic-Groover is removed and the pipe stock is cut by other means at the standard distance beyond this second groove. In either procedure a pipe nipple of the desired length and having the first and second annular seats/grooves at a standard longitudinal displacement from the respective nipple ends is presented.

Accordingly, our apparatus presents a novel method of gauging the longitudinal displacement of the Vic-Groover relative to only one end of the pipe so as to avoid the above discussed on-site manufacture problems.

It is therefore a general object of this invention to provide a method and apparatus adaptable with conventional pipe groovers for on-site manufacture of nipples of relatively short lengths.

Another object of this invention is to provide a method and apparatus, as aforesaid, which utilizes a visual gauge assembly associated with said pipe groover to position the cutting member thereof at user-selectable displacements along the pipe stock relative to only one end thereof.

Still another object of this invention is to provide a method and apparatus, as aforesaid, which utilizes as a base reference point only one free end of the pipe stock.

Another object of this invention is to provide a method and apparatus, as aforesaid, which utilizes connecting spacer pins that position the grooving tool at userselectable, longitudinal displacements along the pipe stock relative to only one end thereof.

Another object of the invention is to provide a method and apparatus, as aforesaid, which utilizes spacer pins of various user-selectable lengths so that selectable nipple lengths can be fabricated on the job site.

Yet another object of the invention is to provide a method and apparatus, as aforesaid, that can be utilized with conventional grooving tools for scoring pipes of different diameters.

Still a further object of the invention is to provide a method and apparatus, as aforesaid, providing for fabrication of pipe nipples on the job site in order to save time, effort, and expense.

The above and further objects and novel features of the invention will more fully appear from the following description when the same is read in connection with the accompanying drawings.

BRIEF DESCRIPTION OF THE DRAWINGS

FIG. 3 is a side elevational view of the apparatus and showing a section of the clamped pipe stock with spacer pins positioning the grooving tool at a scoring position beyond the second annular groove.

FIG. 4 is a side elevational view of the nipple with conventional couplings thereon joining upstream and downstream pipe ends and showing a sectional view of the left coupling.

FIG. 5 is a perspective view of the conventional grooving tool cutting an initial annular groove adjacent the end of the pipe.

FIG. 6 is a side view of a spacer pin and showing in phantom the tapped opening at one end thereof.

DESCRIPTION OF THE PREFERRED EMBODIMENT

Figure 1:
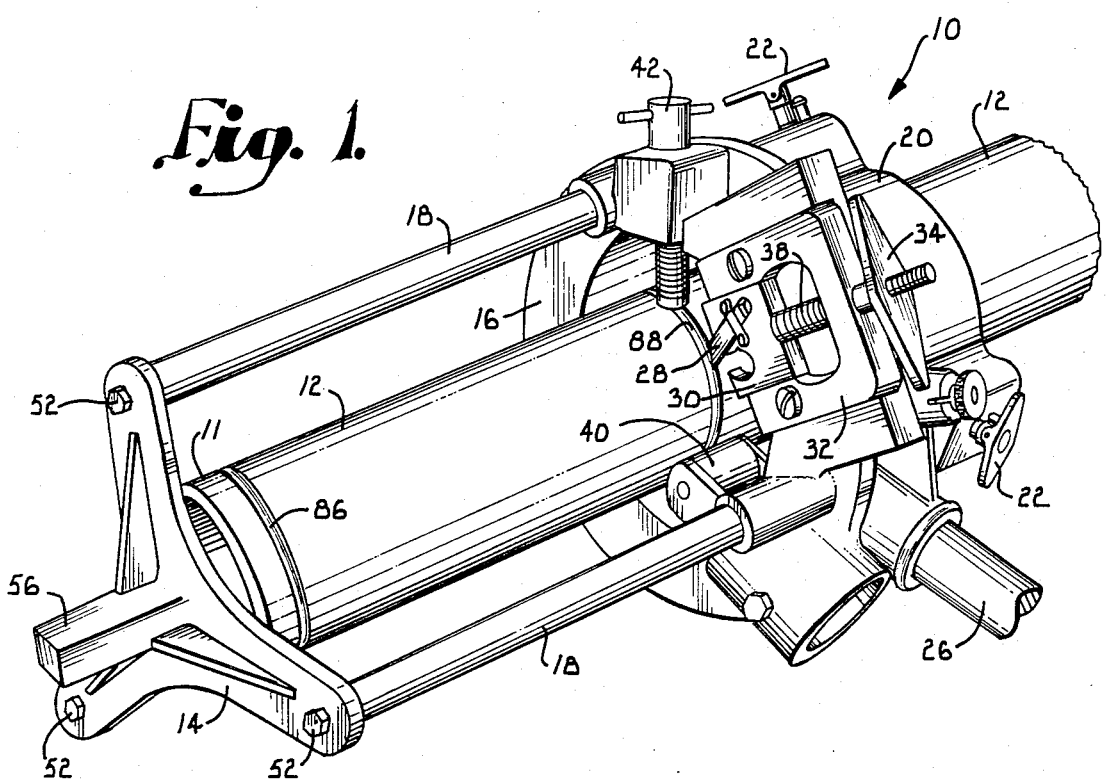
FIG. 1 is a perspective view of the preferred embodiment of the invention, showing the elongated spacer pins extending the pipe grooving tool beyond the first annular groove scored about the adjacent end of the pipe for scoring of the second annular groove therearound.

Reference is made to FIG. 5 showing a perspective view of a conventional grooving tool in normal use. The grooving tool 10 is positioned on a section of pipe stock 12 with the cover yoke 14 abutting the end 11 of the pipe 12. This abutment presents a fixed longitudinal displacement of the body 16 of grooving tool 10 and tool bit 28 from the pipe end 11.

Figure 2:
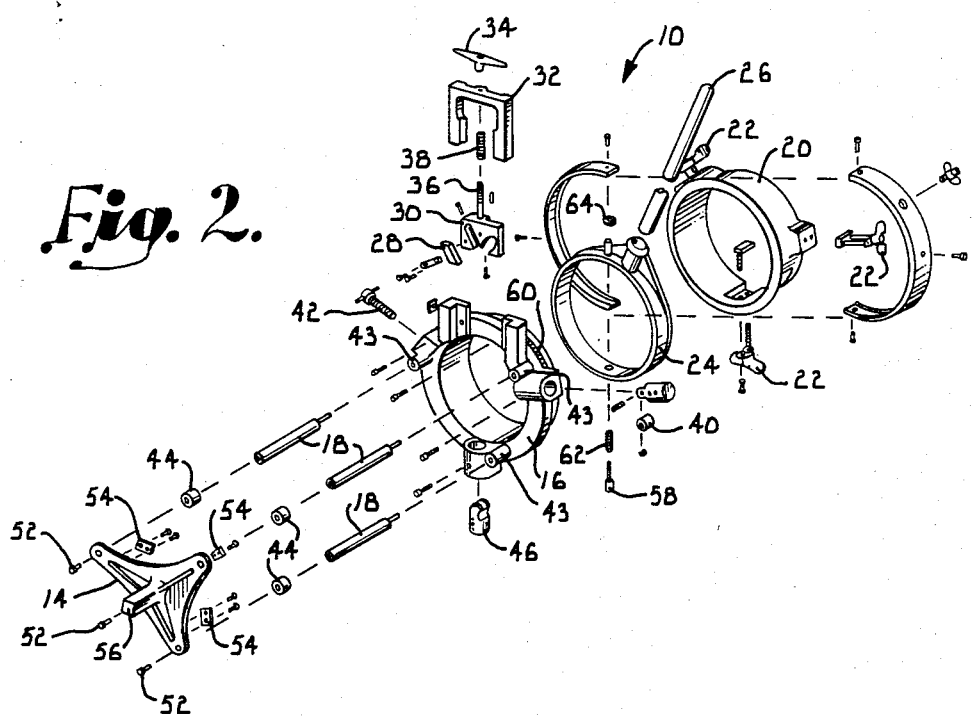
FIG. 2 is an exploded view of the apparatus as shown in FIG. 1, on a reduced scale, and showing the adaptation of the spacer pins with the conventional pipe grooving tool.

FIG. 2 presents an exploded view of the conventional tool with spacer pins 18, spacers 44 placed therein to present the apparatus as shown in FIG. 3.

The grooving tool 10 is secured at its rear bushing 20 to the pipe 12 by means of rear bushing clamp assemblies 22. Located next to the rear bushing 20 is the ratchet housing 24 whereon a ratchet handle 26 is located for manual operation of the grooving tool. The manual positive rotation of the ratchet housing 24 simultaneously rotates the body 16 wherein the tool bit 28 is located for the cutting of a groove in the pipe. The tool bit 28 is positioned in the tool bit holder 30 which is adjustably mounted in carrier 32. Tool bit holder 20 and, therefore, the tool bit 28 are adjusted in the carrier 32 by rotation of the wing handle 34 so as to properly position the tool bit 28 in relation to the pipe 12. The rotation of wing handle 34 adjusts the stem 36 which is fixed to the tool bit holder 30. Feed spring 38 urges the tool bit holder 30 downward towards the pipe 12.

Located on body 16 of the grooving tool 10 are two rollers 40 and a clamp screw 42. The adjustable rollers center the pipe 12 in the opening of body 16 to achieve a uniform grooving of the pipe by the tool bit 28. The clamp screw 42 is adjusted to leave sufficient clearance in order that the pipe may be rotated within the body 16 and to inhibit any off-center movement of the pipe 12 in relation to tool bit 28. Two rollers 40 are shown in FIG. 2 at the apexes of an imaginary triangle with the third apex of the imaginary triangle locating the clamp screw 42.

FIG. 2 shows the means of securing the spacer pins 18 with the grooving tool 10. The spacer pins 18 are screwed into the respective tapped apertures 43 of body 16. FIG. 6 shows a detail of a spacer pin 18 as an elongated shaft 46 with a threaded stud 48 located at the distal end of this threaded shaft 46. At the opposing end of this elongated shaft is an axially tapped opening 50 for either receiving additional spacer pins 18 or conventional bolts 52 as seen in FIG. 2. Secondary spacer elements 44 may also be used and are held in axial alignment with the pins 18 by means of the bolts 52 passing therethrough prior to their engagement with the tapped openings 50 or tapped apertures 43 of body 16.

Fastened on the cover yoke 14 are three pipe end stops 54 which abut the end of the pipe 12 when the yoke 14 is in place. The pipe end stops 54 facilitate the rotation of the cover yoke 14 around the end 11 of the pipe 12. Also located on the cover yoke 14 is a protruding square stud 56 engageable with a chuck for motor driven operation of grooving tool 10. This, therefore, allows either a motor driven operation or a manual ratchet and pawl operation of the grooving tool 10.

The ratchet and pawl mechanism is shown in FIG. 2 with ratchet pawl 58 located on ratchet housing 24 engaging a toothed wheel 60 located on body 16. The ratchet spring 62 urges ratchet pawl 58 towards the toothed wheel 60. Ratchet knob 64 adjusts the length of the ratchet pawl 58 with ratchet spring 62 connected therebetween.

FIG. 4 illustrates the use of a nipple 66 joining pipe end 68 with pipe end 70. The joining of pipe end 70 with the nipple 66 is accomplished by the use of a coupling 72 comprising first 78 and second 80 hemispherical sections joined by fastening clamp 82. A similar coupling 74 joins nipple 66 with pipe end 68. Coupling 74 is shown in a sectional view. The housing keys 76 of coupling 74 seat in the adjacent annular grooves of nipple 66 and pipe end 68 so as to join the pipes one to another. Within the seated coupling 74 is an annular, pressure-responsive gasket 84 which presents a fluid-tight joint about the facing pipe and nipple ends.

OPERATION

In the preferred operation the body 16 of the grooving tool is placed at three longitudinally displaced positions along a clamped 66 pipe stock 12 originating from one end thereof. The first groove 86 is cut by the standard grooving tool as shown in FIG. 5 with the conventional bolts 52 spacing the body 16 and tool bit 28 at a standard longitudinal displacement from the pipe end upon abutment of the yoke 14 with the pipe end 11. After scoring groove 86, three equal spacer pins 18 are selected to extend the body 16 and tool bit 28 to the desired position along the pipe stock 12 for the cutting of the second annular groove 88 as shown in FIG. 1. After scoring of the second groove 88 a new combination of spacer pins 18 and/or spacers are utilized to position the tool at the third desired location for the cutting of the final groove 90 as shown in FIG. 3. The tool bit is then set at a depth to cause separation of the pipe end, as defined by groove 90, from the original pipe stock 12 and thereby present a finished nipple 66. Alternatively, the tool bit 28 is set at a lesser depth to score the end position on the pipe stock 12 so that a saw, cutter or torch can be subsequently used for this separation of the nipple 66 from the pipe stock 12.

The operation of the grooving tool 10 can be achieved by either the manual ratchet and pawl by use of ratchet handle 26 or a motor driven operation can be achieved by operable engagement of the square stud 56 with a motor not shown.

Accordingly, the spacer pins 18 and/or spacers 44 allow the tool 10 to be spaced away from only one end of the pipe stock which thus allows the other end to be clamped or otherwise supported at a position precluding interference with the tool 10 operation. Furthermore, the spacer pins 18 in their parallel extension along the length of the pipe between the pipe end 11 and tool provides a visual gauge to the user of the longitudinal displacement between the aforesaid members. This preclusion enables pipe nipples 66 of relatively short lengths to be quickly and easily manufactured at an on-site location.

It is to be understood that while a certain form of this invention has been illustrated and described, it is not limited thereto, except in so far as such limitations are included in the following claims.

Having thus described the invention, what is claimed as new and desired to be secured by Letters Patent is:

1. For use with a pipe groover having an operable cutting member adapted for movement about pipe stock and means for moving said cutting member about said pipe stock for scoring first and second annular grooves about said pipe stock to form a pipe nipple on said stock having first and second annular seats thereon, the improvement comprising:
   a stop member for contacting one end of said pipe stock;
   fastener means releasably connecting said stop member to said groover in a first longitudinally-spaced apart relationship therebetween, said contact of said stop member positioning said groover at a first longitudinal displacement along the extent of said pipe stock relative to said same one end of said pipe stock for scoring said first annular groove about said pipe stock upon operation of said moving means and said cutting member; and
   a first extension means releasably engageable with said fastener means and said groover and including at least one spacer pin having first and second longitudinally spaced-apart ends, said spacer pin having first means at said first end releasably engaging said fastener means upon release of said fastener means connection from said groover and second means at said second end releasably engaging said groover, said engagement of said spacer pin with said fastener means and said groover displacing said stop member from said groover in a second longitudinally-spaced apart relationship greater than said first spaced relationship whereupon said stop member contact of said same one end of said pipe positions said groover and said cutting member at a second greater longitudinal displacement along the extent of said pipe stock relative to said same one end of said pipe stock for scoring said second annular groove about said pipe stock upon operation of said moving means and said cutting member whereby to form said pipe nipple on said pipe stock with said seats corresponding to said grooves.

2. The apparatus as claimed in claim 1 wherein said respective at least one pin member is of a user-selectable length corresponding to said respective selected longitudinal distance between said first and second annular grooves.

3. The apparatus as claimed in claim 1, wherein said fastener means comprises at least one bolt member functionally connecting said stop member to said groover to present said first longitudinal relationship therebetween.

4. The apparatus as claimed in claim 3, wherein said pin member of said first extension means comprises:
   at least one elongated shaft having first and second ends;
   an aperture at said first end of said shaft for engaging an end of said bolt presented upon release of said connection of said bolt with said groover, whereby to present said first releasable engagement means; and
   said second releasable engagement means being at said second end of said shaft.

5. The apparatus as claimed in claim 1, wherein said moving means comprises:
   means for rotating said stop member about an imaginary axis passing therethrough and through said pipe stock upon said stop member contact; and
   said fastener means and first extension means transferring said rotation of said stop member to said groover for moving the latter through an annular path about said pipe stock to provide said scoring of said respective annular groove upon said operation of said cutting member.

6. A method of forming a pipe nipple from a piece of pipe stock comprising the steps of:
   (a) clamping said pipe stock;
   (b) providing a scoring means;
   (c) providing a stop member;
   (d) connecting said stop member to said scoring means at a first longitudinal displacement therebetween;
   (e) placing said stop member in contact with the end of said pipe opposite the clamped end to present a zone of contact of said scoring means with said pipe at a longitudinally displaced position corresponding to said first longitudinal displacement;
   (f) operating said scoring means to present a first annular groove about said pipe;
   (g) connecting said stop member to said scoring means at a second relatively greater longitudinal displacement therebetween;
   (h) placing said stop member in contact with the end of said pipe in step (e) to present a zone of contact of said scoring means with said pipe corresponding to said second longitudinal displacement beyond said first annular groove;
   (i) operating said scoring means to score a second annular groove about said pipe;
   (j) measuring a selected distance beyond said second annular groove;
   (k) separating said pipe stock at said distance of step
   (j) to present a pipe nipple on said pipe stock having said first and second longitudinally spaced-apart annular grooves thereon.

7. The method as claimed in claim 6, further comprising the steps of:

(l) connecting said stop member to said scoring means at a third relatively greater longitudinal displacement therebetween;

(m) placing said stop member in contact with the end of said pipe in step (e) to present a zone of contact of said scoring means with said pipe corresponding to said third longitudinal displacement beyond said first and second annular grooves;

(n) operating said scoring means to score a third annular groove to define one end of said pipe nipple; and (o) separating said pipe stock at said third annular groove to present said pipe nipple.

8. For use with a pipe groover having an operable cutting member and means for rotating said cutting member about a pipe having first and second ends for scoring an annular groove about said pipe, a system for forming a pipe-connecting nipple having first and second annular grooves thereon comprising:

a stop member for contacting one end of said pipe;

fastener means releasably connecting said stop member to said groover in a longitudinally-spaced relationship therebetween, said contact of said stop member with said one end presenting a first longitudinal displacement of said cutting member from said one end of said pipe for scoring a first annular groove therearound upon operation of said rotating means; and a first extension means positioned intermediate said fastener means and said groover in a releasable connection therebetween for extending said stop member from said groover at a second longitudinally-spaced displacement therebetween greater than said first displacement, said stop member contact with said one end presenting a second longitudinal displacement of said cutting member from said one end of said pipe and beyond said first annular groove for scoring a second annular groove therearound upon operation of said rotating means.

9. For use with a pipe groover having an operable cutting member and means for moving said cutting member about pipe stock having first and second ends for scoring annular grooves about said pipe stock to form a pipe-connecting nipple having first and second annular seats thereon corresponding to said grooves, the improvement comprising:

a separable stop member for contacting one end of said pipe stock;

fastener means releasably connecting said stop member to said groover in a first longitudinally-spaced relationship therebetween, said contact of said stop member positioning said groover and said cutting member at a first longitudinal displacement along the extent of said pipe stock relative to said one end of said pipe stock for scoring a first annular groove therearound upon operation of said cutting member; and extension means releasably interposed between said fastener means and said groover, said interposed extension means further displacing said stop member from said groover in a second longitudinally-spaced relationship therebetween greater than said first spaced relationship whereupon said stop member contact of said same one end of said pipe positions said groover and said cutting member at a second greater longitudinal displacement along the extent of said pipe stock as measured from said same one end of said pipe stock for scoring a second annular groove therearound upon operation of said moving means and said cutting member.

10. The apparatus as claimed in claim 4 wherein said second releasable engagement means comprises a stud member extending from said second end of said shaft for functionally engaging an aperture in said groover presented upon said release of said bolt from said groover.

* * * * *